Figure 1:
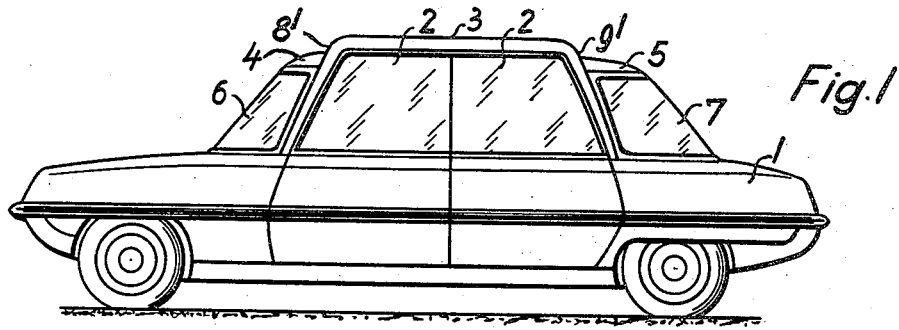

Feb. 16, 1965 B. BARENYI ETAL 3,169,793
MOTOR VEHICLE WITH A CONCAVE TOP
Filed Jan. 6, 1964 3 Sheets-Sheet 1

INVENTORS
BELA BARENYI
PAUL BRACQ
BY Dicke and Craig
ATTORNEYS

Feb. 16, 1965    B. BARENYI ETAL    3,169,793
MOTOR VEHICLE WITH A CONCAVE TOP
Filed Jan. 6, 1964    3 Sheets-Sheet 2
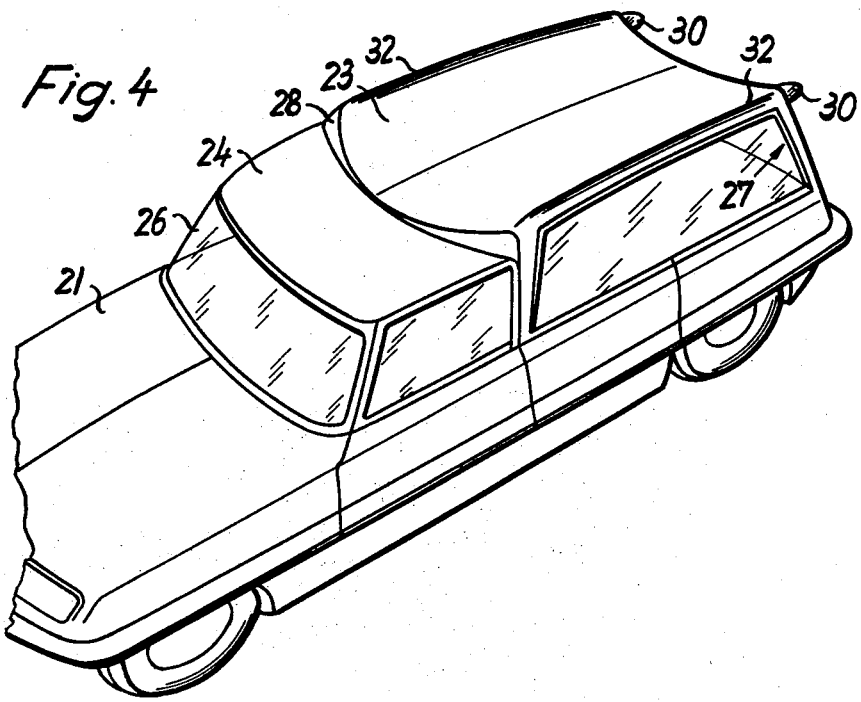
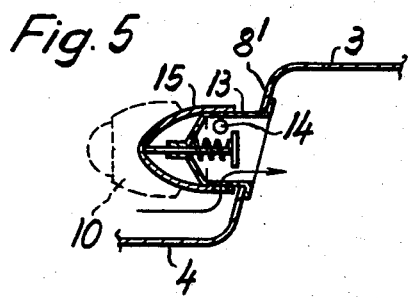
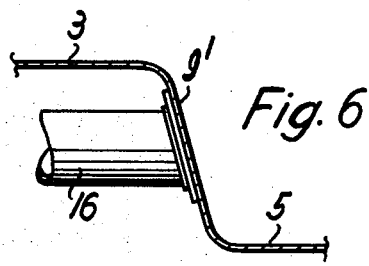
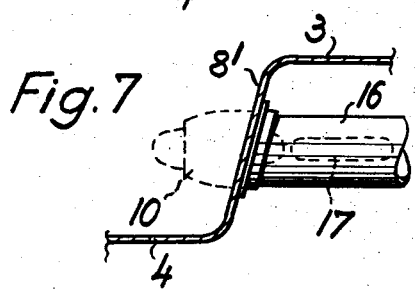
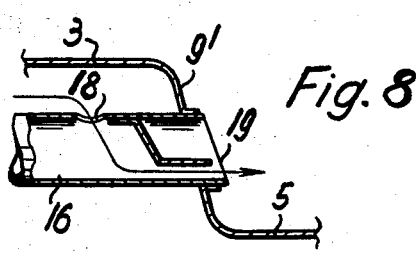
INVENTORS
BELA BARENYI
PAUL BRACQ
BY Dicke and Craig
ATTORNEYS

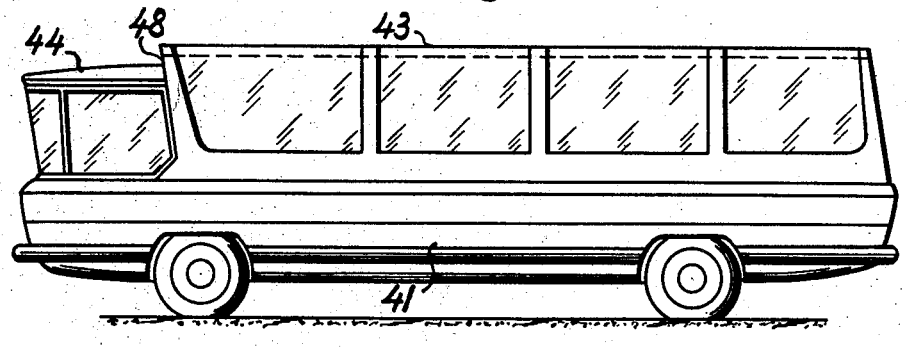
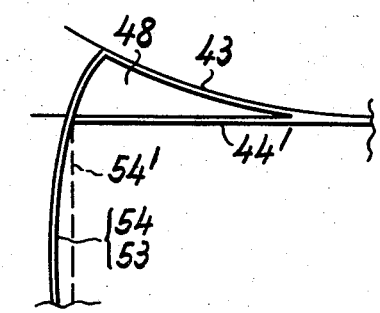
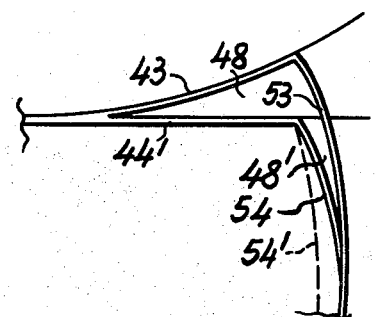
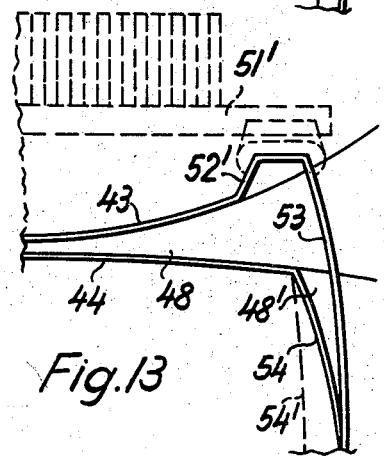
INVENTORS
BELA BARENYI
PAUL BRACQ
ATTORNEYS

United States Patent Office 3,169,793
Patented Feb. 16, 1965

3,169,793
MOTOR VEHICLE WITH A CONCAVE TOP
Béla Barényi, Stuttgart-Vaihingen, and Paul Bracq, Sindelfingen, Germany, assignors to Daimler-Benz Aktiengesellschaft, Stuttgart-Unterturkheim, Germany
Filed Jan. 6, 1964, Ser. No. 335,951
8 Claims. (Cl. 296—137)

The present invention relates to a motor vehicle which is provided with a top which, as seen in cross section, has a concave curvature along a part of its length.

Concave vehicle tops have considerable advantages over the conventional convex tops since they permit the passengers to enter the vehicle much more easily and also permit the top to be more easily loaded with baggage. However, the manner of connecting such a concave top to the windshield or the rear window involves considerable difficulties, especially if the vehicle is to be equipped with panorama windows.

It is an object of the present invention to overcome these difficulties without complicating the construction of the vehicle top in another manner and to design the top so as to permit it to be employed for mounting auxiliary appliances thereon which are desired or required for the operation and use of the vehicle.

It is already known to provide a passenger car, which is equipped with a flat rear window which at its upper side is outwardly inclined, with a top on which a load may be supported directly and only the rear part of which has a concave curvature, while the front part is convex and connected in the usual manner with a panorama windshield. The construction of this car top is, however, very complicated since the top parts which are curved inversely to each other overlap each other and the construction of the joint between the two top parts is thus very difficult.

The present invention consists in designing a vehicle top of the type as described so that at the junction between the concave top part with the flat or convex top part at the front and/or rear end thereof, the lowest point of the concave part is located at an equal or higher level than the highest point of the flat or convex part. In this manner it is possible to construct the junction between the top and the windshield and/or the rear window in the usual manner and also to construct the junction between the two adjacent top parts without difficulty.

The invention results in the further advantage that the transverse wall portion or portions which is or are formed by the change in profile between the concave top part and the front or rear top part may be employed for providing therein air inlet and/or outlet openings or for mounting thereon inside or outside lamps, supporting handles or rods, switches, instruments, or similar auxiliary appliances either individually or in combination with each other. The upwardly projecting edge portions of the concave top part may also be employed as supports for mounting a baggage frame or a baggage rack thereon, preferably in a manner so as to be easily applied and removed.

These and other features and advantages of the present invention will become more clearly apparent from the following detailed description thereof which is to be read with reference to the accompanying drawings, in which—

Figure 3:
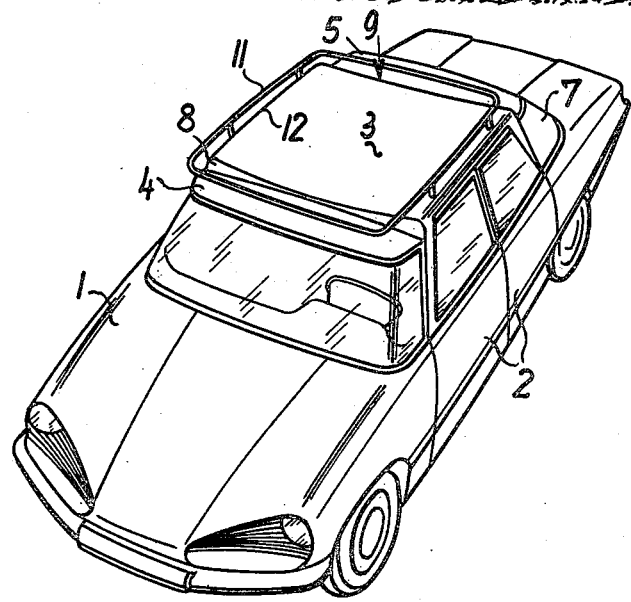
Figure 2:
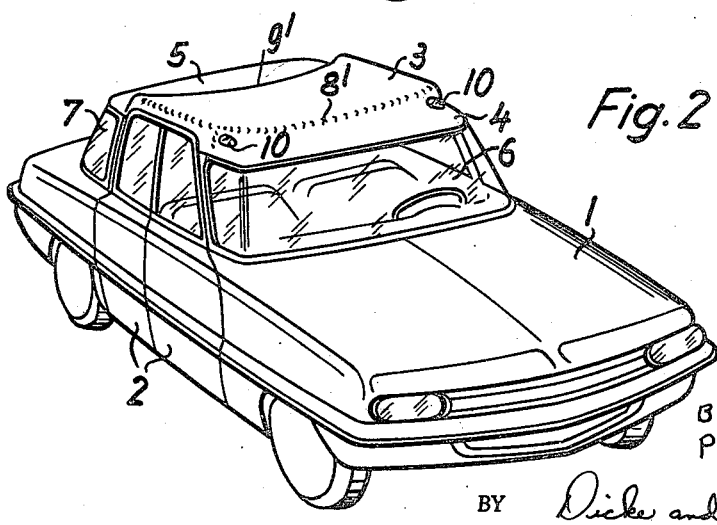

FIGURE 1 shows a side view of a passenger car according to the invention;
FIGURES 2 and 3 show two different perspective views of a car similar to that as shown in FIGURE 1;
FIGURE 4 shows a perspective view of a station wagon according to the invention;
FIGURES 5 to 8 show longitudinal sections which are taken adjacent to the lateral edges of car tops with different auxiliary appliances;
FIGURE 9 shows a side view of an omnibus according to the invention; while
FIGURES 10 to 13 show diagrammatic front views of different modificatons of the contours of the driver's cab and passenger compartment of an omnibus similar to that as shown in FIGURE 9.

Referring first particularly to FIGURES 1 to 3 of the drawings, the passenger car 1 is provided with a top which is divided into several interconnected sections 3, 4, and 5. The main section 3 is located above the doors 2 and has a concave cross-sectional shape, while the front and rear sections 4 and 5 have a conventional convex curvature. At the junction between the adjacent top part, the lowest point of the central concave part 3 of the top is located at the same level or a slightly higher level than the highest points of the front and rear parts 4 and 5, while the sides of the central part 3 are curved upwardly so as to attain door openings of a greater height than in cars of conventional designs with convex tops. The greater height of the door openings and doors has the advantage that the car passengers no longer need to stoop when entering the car. Furthermore rain water flowing off the top will no longer drip on the passengers when entering or leaving the car but will flow in the trough-shaped central part toward the front and rear. The concave shape of the top has the further advantage that baggage may be easily carried directly on the top without requiring the usual additional baggage carrier. The convex front and rear parts 4 and 5 of the top, on the other hand, permit an easy connection of front and rear windows 6 and 7 of a conventional type.

The junction between the differently curved parts 3, 4, and 5 of the top may be achieved without difficulties since, as previously stated, the lowest point of the concave part 3 at its junction with the convex parts 4 and 5 is slightly higher than their highest points. The difficulty of accurately merging these parts with each other is therefore avoided. Although it is easily possible to produce a car top of a shape as shown in FIGURE 1 by pressing it in the usual manner of a single piece of sheet metal, it is also possible to make each section 3, 4, and 5 separately and to connect them to each other by narrow front and rear wall portions 8 and 9, as shown in FIGURE 3. These wall portions 8 and 9 or the corresponding parts 8' and 9' according to FIGURES 1 and 2 which are integral with the main parts 3, 4, and 5 of the top may be employed for mounting auxiliary appliances on the car top. Thus, for example, in FIGURE 2, the front surface 8' is provided with lights 10 which may also be combined with air inlets for the ventilation of the passenger compartment. The car according to FIGURE 3 is further provided with a baggage frame 11 which is mounted on the edge portions 12 of the concave top part 3.

FIGURE 4 illustrates the invention as applied to a station wagon 21 which has a substantially flat rear end 27 which, if desired, may be provided with a door or doors. The concave top portion 23 extends in this case over the entire length of the rear passenger compartment or freight area to the rear end of the car. The connection of the concave top portion 23 to the flat rear end of the car may be carried out without difficulties. At the front of the top, the concave part 23 merges into a concave part 24 which substantially covers the area of the front or driver's seat and permits a conventional panorama windshield 26 to be easily connected thereto. The two top parts 23 and 24 are again connected by a narrow wall portion 28. In this case, the lowest point of the front end of the concave top part 23 is located at substantially the same level as the highest point of the convex top part 24. At the rear end of the car 21, lamps 30 are mounted on the ends of the ribs 32 which are formed by the lateral top edges.

FIGURES 5 to 8 illustrate further details of the manner in which the end surfaces 8' and 9' between the top parts 3, 4, and 5 may be employed for mounting auxiliary appliances on the car. According to FIGURE 5, a tubular socket 13 with air inlet openings 14 is inserted into the front wall portion 8'. These openings 14 may be closed partly or entirely by turning a resilient cap 15. As indicated in FIGURE 5 in dotted lines, this cap 15 may be covered by a lamp 10. FIGURE 6 illustrates the manner of mounting a supporting pipe 16 on the rear wall portion 9'. This supporting pipe preferably extends up to the front wall portion 8' so as to be useful to and within easy access of the passengers of the car to support themselves or to hang clothes hangers or the like thereon. As illustrated in FIGURE 7, such a pipe 16 may also be made of a transparent material and contain a tubular lamp 17 or the like for illuminating the inside of the car, and it may then also contain the cable for this lamp as well as for other purposes. In this case it is advisable also to connect an outer lamp 10 to the end of pipe 16. As shown in FIGURE 8, such a pipe 16 may also be used for the ventilation of the passenger compartment by providing it with air openings 18 and by extending it through the rear wall portion 9' of the top. The rear opening 19 of pipe 16 may then serve as an air outlet.

FIGURE 9 illustrates an omnibus 41 which similarly as the station wagon according to FIGURE 4 is also provided with a concave top part 43 which covers the passenger compartment of the bus and is connected at its front end to the convex top part 44 which only covers the driver's cab. As indicated in FIGURES 10 and 11, the front part 44', instead of being convex, could also be flat. The two top parts 43 and 44 are in this case connected by means of a separate front wall 48 which permits the passenger compartment and the driver's cab to be made of entirely different shapes and independently of each other. The lateral contours 54 of the driver's cab therefore do not need to be similar to the lateral contours 53 of the passenger compartment, as shown in solid lines in FIGURES 10 and 12, but they may deviate therefrom, for example, as shown in FIGURES 11 and 13 in solid lines or as indicated in FIGURES 10 to 13 in dotted lines 54'. The front wall 48 is then enlarged, for example, by the part 48'.

In the top structure of the bus as shown in FIGURES 10 and 11, the lowest point of the concave top part 43 is located at the same level as the flat top part 44', while according to FIGURES 12 and 13 the lowest points of the concave top parts are located above the highest points of the convex top parts 44. Furthermore, the lateral edges of the concave top parts 43 of the bus tops according to FIGURES 12 and 13 are provided with special upwardly bent ribs 52 or 52' which serve for supporting a baggage frame 51 or a baggage rack 51'.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A motor vehicle having a top consisting of at least two differently shaped parts, one of said parts forming the front part connected to the windshield of the vehicle, and the other part connected to said front part and covering at least the central part of the vehicle and having a concave cross section, the lowest point of said concave part at the junction between said two parts being located at least as high from the ground as the highest point of said front part.

2. A motor vehicle as defined in claim 1, wherein the raised edge portions of said concave part serve as a support for baggage holding means.

3. A motor vehicle having a top consisting of at least two differently shaped parts, one of said parts forming the front part having a convex cross section and connected to the windshield of the vehicle, and the other part connected to said front part and covering at least the central part of the vehicle and having a concave cross section, the lowest point of said concave part at the junction between said two parts being located at least as high from the ground as the highest point of said convex part, and downwardly extending connecting parts formed at said junction by the difference in shape between said concave and convex parts at least near the lateral sides of said vehicle.

4. A motor vehicle as defined in claim 3, wherein at least one of said connecting parts serves as a support for at least one auxiliary appliance for the use of the vehicle.

5. A motor vehicle having a top consisting of at least three differently shaped parts, one of said parts forming the front part connected to the windshield of the vehicle, the second part forming the rear part, and the third part covering the central part of the vehicle and connected to said front and rear parts and having a concave cross section, the lowest points of said concave part at the junctions with said front and rear parts being located at least as high from the ground as the highest points of said front and rear parts.

6. A motor vehicle having a top consisting of at least three differently shaped parts, one of said parts forming the front part having a convex cross section and connected to the windshield of the vehicle, the second part forming the rear part, and having a convex cross section, and the third part covering the central part of the vehicle and connected to said convex front and rear parts and having a concave cross section, the lowest points of said concave part at the junctions with said convex parts being located at least as high from the ground as the highest points of said convex parts, and downwardly extending connecting parts formed at said junctions by the difference in shape between said concave and convex parts at least near the lateral sides of said vehicle.

7. A motor vehicle as defined in claim 6, wherein at least one of said connecting parts serves as a support for at least one auxiliary appliance for the use of the vehicle.

8. A motor vehicle as defined in claim 6, further comprising supporting means extending through the inside of the vehicle and connecting the connecting part on the front and rear ends of said concave part at least near one lateral side of the vehicle.

References Cited in the file of this patent

UNITED STATES PATENTS

| 3,112,952 | Barenyi | Dec. 3, 1963 |

FOREIGN PATENTS

| 1,136,094 | France | May 9, 1957 |
| 937,570 | Germany | Jan. 12, 1956 |